US008758862B2

(12) United States Patent
Abrami et al.

(10) Patent No.: US 8,758,862 B2
(45) Date of Patent: Jun. 24, 2014

(54) COATING COMPOSITIONS WITH AN ISOCYANATE-FUNCTIONAL PREPOLYMER DERIVED FROM A TRICYCLODECANE POLYOL, METHODS FOR THEIR USE, AND RELATED COATED SUBSTRATES

(75) Inventors: Siamanto Abrami, Glendale, CA (US); Guangliang Tang, Stevenson Ranch, CA (US)

(73) Assignee: PRC DeSoto International, Inc., Sylmar, CA (US)

( * ) Notice: Subject to any disclaimer, the term of this patent is extended or adjusted under 35 U.S.C. 154(b) by 0 days.

(21) Appl. No.: 13/533,209

(22) Filed: Jun. 26, 2012

(65) Prior Publication Data

US 2013/0344253 A1 Dec. 26, 2013

(51) Int. Cl.
C09D 177/12 (2006.01)
B05D 1/36 (2006.01)
C08L 75/06 (2006.01)

(52) U.S. Cl.
USPC ........................................ 427/407.1; 524/590

(58) Field of Classification Search
CPC ...................................... C08L 75/06
See application file for complete search history.

(56) References Cited

U.S. PATENT DOCUMENTS

| | | |
|---|---|---|
| 3,420,800 A | 1/1969 | Haggis |
| 3,567,692 A | 3/1971 | Haggis et al. |
| 3,789,045 A | 1/1974 | Coury et al. |
| 4,225,515 A | 9/1980 | Weber et al. |
| 4,319,049 A | 3/1982 | Rogier |
| 4,337,349 A | 6/1982 | Orlowski et al. |
| 4,438,225 A | 3/1984 | Peerman |
| 4,469,831 A | 9/1984 | Bueltjer et al. |
| 4,720,535 A | 1/1988 | Schleier et al. |
| 5,010,161 A | 4/1991 | Aoki et al. |
| 5,214,086 A | 5/1993 | Mormile et al. |
| 5,444,117 A | 8/1995 | Wade et al. |
| 5,466,771 A | 11/1995 | Hicks et al. |
| 5,473,043 A | 12/1995 | Maki et al. |
| 5,489,704 A | 2/1996 | Squiller et al. |
| 5,523,376 A | 6/1996 | Hicks et al. |
| 5,545,705 A | 8/1996 | Hicks et al. |
| 5,591,807 A | 1/1997 | Cai et al. |
| 5,661,216 A | 8/1997 | Laginess et al. |
| 5,726,272 A | 3/1998 | Yonek |
| 5,847,195 A | 12/1998 | Roesler |
| 5,973,097 A | 10/1999 | Dantiki et al. |
| 5,998,532 A | 12/1999 | Urs |
| 6,117,966 A | 9/2000 | Venham et al. |
| 6,143,841 A | 11/2000 | Spittka et al. |
| 6,455,666 B1 | 9/2002 | Teranishi et al. |
| 6,482,474 B1 | 11/2002 | Fenn et al. |
| 6,518,388 B1 | 2/2003 | Fenn |
| 6,794,482 B2 | 9/2004 | Gloeckner et al. |
| 7,138,465 B2 | 11/2006 | Gloeckner et al. |
| 7,144,975 B2 | 12/2006 | Gloeckner et al. |
| 7,301,057 B2 | 11/2007 | Dukat et al. |
| 7,736,745 B2 | 6/2010 | Hong |
| 2006/0004139 A1 | 1/2006 | Connelly et al. |
| 2006/0106157 A1 | 5/2006 | Sawant et al. |
| 2009/0068366 A1 | 3/2009 | Aklian et al. |
| 2010/0260954 A1* | 10/2010 | Stenson et al. ............... 428/35.8 |

FOREIGN PATENT DOCUMENTS

| | | |
|---|---|---|
| EP | 0659791 | 11/1998 |
| GB | 766666 | 1/1957 |
| GB | 777793 | 6/1957 |
| JP | 05310879 | 11/1993 |
| WO | 2009013064 | 1/2009 |
| WO | 2009068377 | 6/2009 |

OTHER PUBLICATIONS

Stoye et al., Resins for Coatings Chemistry, Properties and Applications, Dec. 1996, p. 201.*
National Industrial Chemicals Notification and Assessment Scheme, "Full Public Report—Adhesion Resin BL 215 C", May 10, 1995; pp. 1-10, Worksafe Australia, Camperdown, New South Wales, Australia.
Dvorchak, M. J. et al., "Aldimine-Isocyanate Chemistry: Application in High Solids Coatings", Waterborne, Higher-Solids, and Powder Coatings Symposium, Feb. 22-24, 1995; pp. 1-10, The University of Southern Mississippi, Department of Polymer Science and Southern Society for Coatings Technology.
Evonik Industries, "TEGO AddBond—For Maximum Adhesion", pp. 1-8, 2004.
Evonik Industries, "Vestamin A 139", pp. 1-2, 2004.
Lee, S. M. et al., "Aldimine-Isocyanate Chemistry: A Foundation for High Solids Coatings", Waterborne, Higher-Solids, and Powder Coatings Symposium, Feb. 22-24, 1995; pp. 1-11, The University of Southern Mississippi, Department of Polymer Science and Southern Society for Coatings Technology.
Wicks, Douglas A. et al., "Amine chemistries for isocyanate-based coatings", Progress in Organic Coatings, 1997, pp. 265-270, vol. 30, Elsevier Science S.A.

* cited by examiner

*Primary Examiner* — Randy Gulakowski
*Assistant Examiner* — Jeffrey Washville
(74) *Attorney, Agent, or Firm* — William Lambert

(57) ABSTRACT

Coating compositions include (a) an isocyanate functional prepolymer derived from a polyisocyanate and a tricyclodecane-containing polyester polyol; and (b) a blocked amine curing agent.

16 Claims, No Drawings

COATING COMPOSITIONS WITH AN ISOCYANATE-FUNCTIONAL PREPOLYMER DERIVED FROM A TRICYCLODECANE POLYOL, METHODS FOR THEIR USE, AND RELATED COATED SUBSTRATES

FIELD

The present invention relates to coating compositions and methods for using such compositions.

BACKGROUND

Polyurethane coatings are known for durability, toughness, and fluid resistance and have been widely used in various applications, including automotive and aerospace applications. These coatings are often formed from a multi-component composition in which one component includes one or more hydroxyl functional ingredients and another component includes one or more polyisocyanates. The components are mixed together immediately prior to use and, in many cases, can be slow to cure at ambient conditions unless accelerated with a catalyst. The presence of such a catalyst, however, significantly shortens the pot life of the combined composition. Moreover, these coatings typically require a significant induction time after the components are combined and mixed to compatibilize all of the reactive ingredients. An insufficient induction time can cause serious coating defects. With demands for higher productivity and lower cost associated with painting by original equipment manufacturers and refinishers, it is, therefore, desirable to have coating compositions that cure rapidly, have relatively long pot life, and require no induction time to form a high performance coating.

The coating of an aerospace vehicle is a multi-layer process typically including application of a substrate surface treatment, a primer coating, a colored (typically opaque) basecoat, and a transparent (typically colorless) clearcoat. Due to stringent performance requirements, such as durability and fluid resistance, the various coating layers are typically highly crosslinked and have a relatively short overcoat window, which refers to the maximum amount of time between application of coating layers before abrasion of the first layer becomes necessary for good intercoat adhesion. Overcoat windows are typically short time periods, usually varying between 12 and 24 hours depending on cure temperature. Such a short overcoat window presents a challenge when coating large objects, such as an aircraft. As a result, abrasion by sanding is a common, but undesirable, practice to get sufficient intercoat adhesion between coating layers, such as a basecoat and a clearcoat. Therefore, it is desirable to provide coatings with properties, such as durability and fluid resistance, suitable for various applications, including aerospace applications, while having a longer overcoat window.

SUMMARY OF THE INVENTION

In certain respects, the present invention is directed to coating compositions. The coating compositions comprise: (a) an isocyanate functional prepolymer comprising a reaction product of reactants comprising: (i) a polyisocyanate; and (ii) a tricyclodecane-containing polyester polyol; and (b) a blocked amine curing agent.

The present invention is also directed to, inter alia, methods for using such compositions and substrates coated with a coating layer deposited from such coating compositions.

DETAILED DESCRIPTION OF EMBODIMENTS OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As indicated above, certain embodiments of the present invention are directed to coating compositions. The compositions of the present invention can be deposited upon any of a variety of substrates. In certain embodiments, however, the substrate is electrically conductive, such as is the case with substrates comprising titanium, stainless steel, aluminum, as well as electrically conductive composite materials, such as polymeric materials containing a sufficient amount of conductive filler. In some embodiments, the substrate forms a component part of a vehicle, such as an aerospace vehicle.

The coating compositions of the present invention comprise an isocyanate functional prepolymer. As used herein, an "isocyanate functional prepolymer" refers to an ungelled reaction product of one or more polyisocyanates with one or more compounds comprising isocyanate reactive groups, such as a hydroxyl groups, wherein the reactants are reacted in relative amounts such that the reaction product has isocyanate functional groups.

As used herein, the term "ungelled" means the prepolymer is substantially free of crosslinking and has an intrinsic viscosity when dissolved in a suitable solvent, as determined, for example, in accordance with ASTM-D1795 or ASTM-D4243. The intrinsic viscosity of the prepolymer is an indication of its molecular weight. A gelled reaction product, on the other hand, since it is of essentially infinitely high molecular weight, will have an intrinsic viscosity too high to measure. As used herein, a reaction product that is "substantially free of crosslinking" refers to a reaction product that has a weight average molecular weight (Mw), as determined by gel permeation chromatography, of less than 1,000,000. In certain embodiments of the present invention, the isocyanate functional prepolymer has a Mw of no more than 50,000, such as no more than 20,000, or, in some cases, no more than 10,000 and/or a polydispersity index (Mw/Mn) of no more than 4, such as no more than 3 or no more than 2.5. The molecular weight values reported herein can be determined by gel permeation chromatography (GPC) using polystyrene standards as is well known to those skilled in the art and such as is discussed in U.S. Pat. No. 4,739,019, at column 4, lines 2-45.

As indicated earlier, the coating compositions of the present invention comprise an isocyanate functional prepolymer comprises a reaction product of reactants comprising a polyisocyanate. As used herein, the term "polyisocyanate" includes compounds, monomers, oligomers and polymers comprising at least two —N=C=O functional groups and/or at least two —N=C=S (isothiocyanate) groups.

Suitable polyisocyanates for use in preparing the isocyanate functional prepolymer of the compositions of the present invention include monomeric, oligomeric and/or polymeric polyisocyanates. The polyisocyanates can be $C_2$-$C_{20}$ linear, branched, cyclic, aromatic, aliphatic, or combinations thereof.

Suitable polyisocyanates for use in the present invention may include, but are not limited to, isophorone diisocyanate (IPDI), which is 3,3,5-trimethyl-5-isocyanato-methyl-cyclohexyl isocyanate; hydrogenated materials, such as cyclohexylene diisocyanate, 4,4'-methylenedicyclohexyl diisocyanate ($H_{12}$MDI); mixed aralkyl diisocyanates, such as tetramethylxylyl diisocyanates, OCN—C(CH$_3$)$_2$—C$_6$H$_4$C(CH$_3$)$_2$—NCO; polymethylene isocyanates, such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate; and mixtures thereof.

As indicated, in certain embodiments, the polyisocyanate can include an oligomeric polyisocyanate, such as, but not limited to, dimers, such as the uretdione of 1,6-hexamethylene diisocyanate, trimers, such as the biuret and isocyanurate of 1,6-hexanediisocyanate and the isocyanurate of isophorone diisocyanate, allophonates, and polymeric oligomers. Modified polyisocyanates can also be used, including carbodiimides and uretone-imines, and mixtures thereof. Suitable materials include those available under the designation DESMODUR from Bayer Corporation of Pittsburgh, Pa., such as DESMODUR N 3200, DESMODUR N 3300 (hexamethylene diisocyanate trimer), DESMODUR N 3400 (60% hexamethylene diisocyanate dimer and 40% hexamethylene diisocyanate trimer), DESMODUR XP 2410 and DESMODUR XP 2580.

In some embodiments, the polyisocyanate used to prepare the isocyanate functional prepolymer present in the coating compositions of the present invention may itself comprise an isocyanate functional prepolymer formed from a reaction mixture comprising a polyisocyanate and another material, such as a polyol. Any polyisocyanate known in the art, such as any of those described above, can be used in the formation of such a prepolymer.

In some embodiments, the polyol used in the formation of such a prepolymer is, for example, a polytetrahydrofuran material such as those sold under the trade name TERATHANE (e.g., TERATHANE 250, TERATHANE 650, and TERATHANE 1000 available from Invista Corporation).

In certain embodiments, the polyisocyanate comprises a non-prepolymer polyisocyanate and an isocyanate functional prepolymer. The non-prepolymer polyisocyanate can be the same or different from the polyisocyanate used to form the isocyanate functional prepolymer. If combinations of polyisocyanates are used, the polyisocyanates should be substantially compatible; for example, the isocyanate functional prepolymers can be substantially compatible with the non-prepolymer polyisocyanate. As used herein, "substantially compatible" means the ability of a material to form a blend with other materials that is and will remain substantially homogeneous over time.

In some embodiments of the present invention, the polyisocyanate used to prepare the isocyanate functional prepolymer present in the compositions of the present invention itself comprises a polyether polyol, polyester polyol, and/or a polyether polyamine prepolymer chain-extended with a polyisocyanate, such as a polyisocyanate selected from isophorone diisocyanate, cyclohexylene diisocyanate, 4,4'-methylenedicyclohexyl diisocyanate; tetramethylxylyl diisocyanate, 1,4-tetramethylene diisocyanate, 1,5-pentamethylene diisocyanate, 1,6-hexamethylene diisocyanate, 1,7-heptamethylene diisocyanate, 2,2,4- and 2,4,4-trimethylhexamethylene diisocyanate, 1,10-decamethylene diisocyanate, 2-methyl-1,5-pentamethylene diisocyanate, phenylene diisocyanate, toluene diisocyanate, xylene diisocyanate, 1,5-naphthalene diisocyanate, chlorophenylene 2,4-diisocyanate, bitoluene diisocyanate, dianisidine diisocyanate, tolidine diisocyanate, methylenediphenyl diisocyanate, 3,3'-dimethyl-4,4'-diphenylmethane diisocyanate, polymeric methylenediphenyl diisocyanate, and mixtures thereof.

As indicated earlier, the isocyanate functional prepolymer included in the compositions of the present invention is a reaction product of a polyisocyanate, such as any of those described above, and a tricyclodecane-containing polyester polyol. As used herein, the term "tricyclodecane-containing polyester polyol" refers to a polyester resin comprising at least two hydroxyl functional groups and at least one, often more than one, tricyclodecane moieties in the polymer chain. As used herein, "tricyclodecane" refers to a moiety having three cyclo rings and ten carbon atoms, such as those having the structure (I):

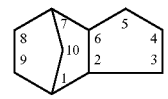

(I)

Such polyester polyols can be prepared in any known manner, for example, by condensation of polyols and polycarboxylic acids.

In certain embodiments, the alcohol component from which the polyester polyol is derived comprises a tricyclodecane-containing polyol, such as a diol with a tricyclodecane nucleus, examples of which include x,y-bis(hydroxymethyl)tricyclo[5,2,1,0$^{2,6}$]decane, wherein x is 3, 4, or 5 and y is 8 or 9, including mixtures thereof, such as, for example, a mixture of 3,8-bis(hydroxymethyl)tricyclo[5,2,1,0$^{2,6}$]decane, 4,8-bis(hydroxymethyl)tricyclo[5,2,1,0$^{2,6}$]decane, and 5,8-bis(hydroxymethyl)tricyclo[5,2,1,0$^{2,6}$]decane. In addition to such polyols, the alcohol component may further comprise other polyols, including, but not limited to, ethylene glycol, propanediol, butanediol, pentanediol propanediol, cyclohexanedimethanol, hexanediol, neopentyl glycol, trimethylolethane, trimethylolpropane, pentaerythritol, and mixtures thereof.

In some embodiments, the tricyclodecane-containing polyol is present in the alcohol component in an amount of at least 10 weight percent, such as at least 20 weight percent, or at least 30 weight percent, based on the total weight of the alcohol component used to prepare the tricyclodecane-containing polyester polyol. In some embodiments, the tricyclodecane-containing polyol is present in the alcohol component in an amount of no more than 90 weight percent, such as no more than 80 weight percent, or no more than 70 weight percent, based on the total weight of the alcohol component used to prepare the tricyclodecane-containing polyester polyol.

Suitable polycarboxylic acids for use in preparing the foregoing polyester polyol include, but are not limited to, unsaturated, aromatic, aliphatic, cycloaliphatic monocarboxylic, dicarboxylic and polycarboxylic acids, such as fumaric acid, itaconic acid, maleic acid, phthalic acid, succinic acid, sebacic acid, hexahydrophthalic acid, decanedicarboxylic acid, adipic acid, azelaic acid, isononanoic acid, tetrahydrophthalic acid, and trimellitic acid, including mixtures thereof. Besides the polycarboxylic acids mentioned above, functional equivalents of the acids such as anhydrides where they exist or lower alkyl esters of the acids such as the methyl esters may be used.

In certain embodiments, the alcohol component and the acid component are reacted together in a molar ratio of 0.5 to 2.0, such 0.8 to 1.5, or 1.0 to 1.1 moles of the alcohol component per 1 mole of the acid component, to form the tricyclodecane-containing polyester polyol. In certain embodiments, the tricyclodecane-containing polyester polyol has a hydroxyl number of 10 to 200 mg KOH/g, such as 10 to 100 mg KOH/g, 10 to 50 mg KOH/g, or in some cases, 20 to 40 mg KOH/g. In certain embodiments, the tricyclodecane-containing polyester polyol has an acid number of 1 to 50 mg KOH/g, such as 1 to 40 mg KOH/g, or in some cases, 1 to 30 mg KOH/g. In certain embodiments, tricyclodecane-containing polyester polyol has a Tg of −30° C. to 80° C., such as −20° C. to 50° C., such as −10 to 40° C. In certain embodiments, the tricyclodecane-containing polyester polyol is unsaturated.

The tricyclodecane-containing polyester polyol can be prepared, for example, by heating the alcohol component and the acid and/or anhydride component in a reactor and distilling off the water produced from the reaction system. This reaction does not always require a catalyst, but the use of a catalyst can accelerate the reaction. Suitable catalysts include, but are not limited to, acetates, carbonates, hydroxides, and alkoxides of alkali metals, alkaline earth metals, zinc, titanium, cobalt, manganese, and other metals. The esterification reaction is often performed at atmospheric pressure, but may be performed under a reduced pressure to enhance distilling-off of water and excessive alcohol component. In some embodiments, the tricyclodecane-containing polyester polyol is not derived from a caprolactone.

Specific examples of tricyclodecane-containing polyester polyols, which are commercially available and suitable for use in the present invention, are ADHESION RESIN LTW, LTH, and LTS, which are commercially available from Evonik Tego Chemie GmbH.

To prepare the isocyanate functional prepolymer of the compositions of the present invention, an excess of one or more of the aforedescribed polyisocyanates is reacted with one or more polyols that include the tricyclodecane-containing polyester polyol in a relative amount such that the resulting reaction product contains isocyanate functionality. Other polyols that may be used in combination with the tricyclodecane-containing polyester polyol include any of the polyols previously mentioned herein. In certain embodiments, the polyol component consists essentially of the tricyclodecane-containing polyester polyol, which, as used herein, means that the tricyclodecane-containing polyester polyol is present in an amount of at least 90 percent by weight, such as at least 95 percent by weight, or, in some cases, at least 99 percent by weight, based on the total weight of the polyols reacted with the polyisocyanate(s) to make the isocyanate functional prepolymer. In certain embodiments, the polyisocyanate and the tricyclodecane-containing polyester polyol are reacted in amounts such that the tricyclodecane-containing polyester polyol is used in an amount of greater than 5 percent by weight, such as at least 10 percent by weight, based on the total weight of the isocyanate functional prepolymer. In addition, in certain embodiments, the polyisocyanate and the tricyclodecane-containing polyester polyol are reacted in amounts such that the tricyclodecane-containing polyester polyol is used in an amount of no more than 95 percent by weight, no more than 90 percent by weight, no more than 75 percent by weight, no more than 55 percent by weight, no more than 40 percent by weight, or, in some cases, no more than 30 percent by weight, based on the total weight of the isocyanate functional prepolymer.

As will be appreciated, the isocyanate functional prepolymer contains urethane linkages as a result of the reaction of hydroxyl groups with isocyanate groups. When polyurethane-forming components are combined to produce polyurethanes, the relative amounts of the ingredients is often expressed as a ratio of the available number of reactive isocyanate groups to the available number of reactive hydroxyl groups, i.e., an equivalent ratio of NCO:OH. For example, a ratio of NCO:OH of 1.0:1.0 is obtained when the weight of one NCO equivalent of the supplied form of an isocyanate component is reacted with the weight of one OH equivalent of the supplied form of a polyol component.

In certain embodiments of the present invention, the reactants used to make the isocyanate functional prepolymer present in the coating compositions of the present invention are used in relative amounts such that the equivalent ratio of NCO:OH is greater than 5:1, such as greater than 10:1, such as at least 20:1, at least 30:1, at least 40:1, at least 50:1, or, in some cases, at least 60:1. In certain embodiments, the reactants are reacted in amounts such that the equivalent ratio of NCO:OH is no more than 150:1, such as no more than 100:1.

Indeed, it has been discovered that, in forming the isocyanate functional prepolymer used in the compositions of the present invention, the reaction of a tricyclodecane-containing polyester polyol with a polyisocyanate, wherein in a very large stoichiometric excess of isocyanate is present in the reaction mixture, as described above, is critical to achieving stable coating compositions having a sufficient pot life to make the composition practically usable.

In certain embodiments of the present invention, the polyisocyanate is present in an amount of at least 5 percent by weight, such as at least 10 percent by weight, or at least 25 percent by weight, at least 45 percent by weight, at least 60 percent by weight, at least 75 percent by weight, the weights percents being based on the total weight of the isocyanate functional prepolymer. In certain embodiments of the present invention, the polyisocyanate is present in an amount of less than 95 percent by weight, such as no more than 90 percent by weight, the weights percents being based on the total weight of the isocyanate functional prepolymer.

The reaction between the polyisocyanate and the polyol may take place in a suitable solvent which may optionally be removed by distillation after the reaction along with any unreacted volatile starting polyisocyanates still present. This reaction may take place at ambient temperature with long reaction time or may be carried out at elevated temperature in a temperature controlled reactor. The isocyanate functional prepolymer also includes NCO semi-prepolymers which contain unreacted starting polyisocyanates in addition to the urethane group-containing prepolymers. The isocyanate functional prepolymer often has an isocyanate content of 1 to 30%, such as 2 to 20%, or, in some cases, 4 to 15%.

In certain embodiments of the coating compositions of the present invention, the isocyanate functional prepolymer is present in the composition in an amount of at least 20 percent by weight, such as at least 35 percent by weight, at least 45 percent by weight, or in some cases, at least 55 percent by weight, based on the total resin solids of the coating composition.

In addition to the isocyanate functional prepolymer, the coating compositions of the present invention further comprise a blocked amine curing agent. Non-limiting examples of suitable blocked amines include aldimines, ketimines, and oxazolidines. Of course, mixtures of two or more of such blocked amines can be used. Aldamines and ketimines are compounds comprising groups of the formula:

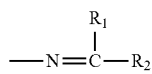

and oxazolidines are compounds comprising groups of the formula:

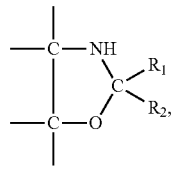

wherein, in each case, $R_1$ and $R_2$ are each independently H, alkyl, cycloaliphatic or substituted alkyl, aryl, or a cycloaliphatic group.

As will be appreciated, ketimines and aldimines are obtained by reaction of a polyamine with an aldehyde (in the cases of aldimines) or a ketone (in the case of ketimines). As will also be appreciated, oxazolidines are produced by condensation reacting a ketone and/or aldehyde with an alkanolamine Aldehydes and ketones suitable for use in making the aldimines, ketimines and oxazolidines used in certain embodiments of the present invention include, but are not necessarily limited to, those containing 1 to 8 carbon atoms, such as propionaldehyde, butyraldehyde, isobutyraldehyde, acetone, methyl ethyl ketone, methyl isobutyl ketone, diisopropyl ketone, cyclopentanone and cyclohexanone. One example of a suitable aldimine is VESTAMIN® A 139, an isophorone diamine aldimine, commercially available from Evonik Industries, Marl, Germany.

As will be appreciated, upon exposure to moisture, oxazolidines hydrolyze to form a hydroxylamine, while ketimines and aldimines produce amine and the corresponding ketone or an aldehyde. The hydroxylamine and amine thus produced react with the isocyanate-functional prepolymer described herein to produce a cured coating. In certain embodiments, the blocked amine curing agent is used in the composition in an amount such that, when unblocked, the ratio of equivalents of isocyanate groups in the composition to equivalents of curing agent functional group is in the range of 0.5 to 8:1, such as 0.8 to 5:1, or, in some cases, 1 to 3:1.

In addition to the components described above, the coating compositions of the present invention can further comprise any of a variety of other components, such as solvents, catalysts, colorants, additives, and the like.

The selection of organic solvents can contribute to adhesion improvement and final coating performance. In general, the solvent or solvents may be chosen to wet the surface of the underlying surface, such as a cured coating, lower the surface tension of the coating composition, dissolve the binder resin of the coating composition, facilitate the interpenetration of functional groups between coating layers, control the film formation, provide an environment for the curing reaction, and/or adjust the application time and/or pot-life. In addition, the solvent or solvents may be chosen to be miscible and/or compatible with the other components of the coating. Suitable organic solvents include, but are not limited to, aliphatic hydrocarbons such as hexane, heptane, octane, and the like; aromatic hydrocarbons such as benzene, toluene, xylene, and the like; ketones such as methyl n-propyl ketone, methyl isobutyl ketone, diisobutyl ketone, methyl ethyl ketone, methyl hexyl ketone, ethyl butyl ketone, and the like; and esters such as ethyl acetate, propyl acetate, butyl acetate, isobutyl acetate, isobutyl butyrate, ethyl propionate, amyl acetate, 2-ethylhexyl acetate, and the like. So-called "VOC exempt" solvents, such as acetone, tertiary-butyl acetate, and Oxsol 100, are also suitable. When used, the solvent(s) can be present at, for example, 20 to 60 weight percent, such as 30 to 50 weight percent, based on total weight of the coating composition.

In certain embodiments, the coating compositions of the present invention can further comprise a catalyst, such as an acid catalyst, to get the desired curing rate. In addition to the reaction rate, coating performance such as interlayer adhesion, application time, pot-life, and/or dry-to-tape, can be affected by the type and amount of catalyst(s). When used, the total amount of catalyst can be, for example, 0.001 to 0.5 weight percent, such as 0.005 to 0.25 weight percent, based on total solids resin weight of the coating composition.

In certain embodiments, the coating compositions of the present invention also comprise a colorant. As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coating compositions of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DP-PBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in solvent-based or solvent miscible carriers such as EDS and EDU pigments commercially available from Clamant, CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are described, for example, in U.S. Pat. No. 7,605,194 at col. 3, line 56 to col. 16, line 25, the cited portion of which being incorporated herein by reference.

Example special effect compositions that may be used in the coating compositions of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, which is incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used in the coating compositions of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In certain embodiments, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with certain embodiments of the present invention, have minimal migration out of the coating. Example photosensitive compositions and/or photochromic compositions and methods for making them are identified in United States Published Patent Application No. 2006-0014099 A1, which is incorporated herein by reference.

In certain embodiments, the coating composition comprises a combination of different visibly absorbing infrared transparent pigments, as described in U.S. patent application Ser. No. 13/153,861.

In general, the colorant can be present in the coating composition in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

In certain embodiments, the final formulated coating compositions of the present invention are substantially, or, in some cases, completely free of hydroxyl functional compounds, such as polyols. As used herein, "substantially free" means that any hydroxyl functional compounds present in the composition are present as an incidental impurity and are not intentionally added to the composition.

The coating compositions of the present invention may be embodied as a single-component or a multi-component composition, such as a two component or "2K" composition, preferably, however, for convenience of use the coating composition is embodied as a single-component coating composition in which all of the composition components are combined and packaged together in a single container. In these single-component embodiments, the composition is stable under conditions substantially free of moisture and at ambient temperatures. Upon application to a substrate, the composition is exposed to moisture which deblocks the blocked amine groups of the curing agent, thereby allowing the composition to cure to form a cured coating. As used herein, "free of moisture" and "substantially free of moisture" means that although the composition may contain some moisture, the amount of moisture is not sufficient to effect substantial curing of the composition.

In certain embodiments, isocyanate groups in the present coating compositions may react with isocyanate-reactive groups present on the surface of another coating layer, such as an adjacent polyurethane coating, to produce a strong and durable chemical bond with the adjacent coating. When a second coating, such as a polyurethane topcoat that contains polyols and/or isocyanates, is applied to the coatings of the present invention, the functional groups of that second coating can react with the functional groups of the present coatings to form chemical bonding and polymer chain entanglement between the coating layers. The result can be a multi-layer coating composite with good intercoat adhesion. In certain embodiments, the coating compositions described herein can be applied to a cured polyurethane coating, without first mechanically abrading or solvent stripping the surface. Prior to application of the coating composition, the surface to be coated can, if desired, be treated to remove particulates and surface films. The coating compositions as disclosed herein can be applied to any appropriate dry film thickness. In certain embodiments, the dry film thickness of the coating can range from 0.2 mils to 2 mils, such as from 0.2 mils to 1 mil.

In certain embodiments, the coating compositions of the present invention can be used as a tie-coat to provide enhanced adhesion between an underlying surface and a subsequently applied coating. The underlying surface can have a pre-existing coating, such as a pre-existing polyurethane coating. Accordingly, the present invention is further directed to a method of treating a surface by applying a coating composition of the present invention to at least a portion of the surface, such as a pre-existing coating, applying a new coating, sometimes referred to herein as a second coating, to at least a portion of the surface coated with the coating of the present invention, and curing the second coating. The appropriate curing conditions will be known to one skilled in the art based on the coating used. The tie coat of the present invention can be dried and/or cured prior to application of the subsequently applied coating(s). Any number of tie coat and/or coating layers can be applied. In certain embodiments, the underlying surface will comprise a cured polyurethane coating, and, in certain embodiments, the second coating will comprise a polyurethane coating, and in certain embodiments, both the underlying surface and the second coating will comprise polyurethane.

The coating compositions of the present invention can be applied to a surface by brushing, spraying, dipping, rolling, flowing, and the like. Once the composition is applied to a surface, film formation can be achieved with or without drying or heating. The time required for the coating to cure can depend at least in part on the solvent applied, the thickness of the coating, the vapor pressure of the solvent, the temperature and humidity, and/or the airflow at the surface. In certain embodiments, the cure time of the composition can range from 20 minutes to 24 hours.

A second coat can be applied to the coatings of the present invention using any appropriate coating method known in the art. More than one topcoat can be applied to any appropriate dry film thickness. For example, in certain embodiments the dry film thickness of a topcoat can range from 1 mil to 6 mils, such as from 2 mils to 4 mils. The topcoat can be cured according to recommended procedures known to those skilled in the art.

Following application of the coating composition to the underlying surface, both the tie-coat and second coating (or any additional coatings) can have excellent adhesion characteristics after full cure at ambient temperature for at least one week, or 24 hours at 60° C.

Adhesion can be determined by any appropriate methods, for example, Dry/Wet Tape Adhesion Test according to BSS 7225, or the Whirling Arm Test described below.

The coating compositions described herein can provide coatings that are durable, having a pleasing, relatively glossy appearance, acceptable chemical and fluid resistance, and good intercoat adhesion. The coating compositions cure rapidly, require no induction time (can be applied immediately after mixing with good results), and have long pot life.

In addition, embodiments of the coatings described herein have an overcoat window of at least 48 hours or at least 72 hours, which means that a subsequent coating layer can be applied well after the first coating layer while still obtaining good intercoat adhesion between the two coating layer as determined by passage of the Whirling Arm Test described below, even without prior abrasion of the first coating layer.

These and other aspects of the claimed invention are further illustrated by the following non-limiting examples.

EXAMPLES

Testing Methods

Testing Methods for the Isocyanate Functional Prepolymer and Coatings

Isocyanate content of the prepolymer was determined according to ASTM D2572, Standard Test Method for Isocyanate Groups in Urethane Materials or Prepolymers.

Solids content of the prepolymer and the coatings was determined according to ASTM D2369, Standard Test Method for Volatile Content of Coatings.

Density of the prepolymer and coatings was determined according to ASTM D1475, Standard Test Method for Density of Liquid Coatings, Inks, and Related Products.

Viscosity of the coatings was determined according to ASTM D4212, Standard Test Method for Viscosity by Dip-Type Viscosity Cups, with #2 Signature Zahn cup at 25° C.

Dry adhesion of the coatings was determined according to ASTM D3359, Standard Test Methods for Measuring Adhesion by Tape Test, Test method B. A crosshatch pattern was scribed through each coating composition down to the substrate. A strip of 1 inch wide masking tape, such as 3M type 250, was applied. The tape was pressed down using two passes of a 4.5-pound rubber covered roller. The tape was removed in one abrupt motion perpendicular to the panel. The adhesion was rated by a visual examination of the paint at the crosshatch area.

Wet resistance of the coatings was determined according to ASTM D870, Standard Practice for Testing Water Resistance of Coatings Using Water Immersion. A sample was immersed in deionized water at 60° C. oven for 24 hours and then the sample was wiped dry with paper towels, immediately scribed, and the tape adhesion was checked within 5 minutes according to ASTM D3359, method B.

Pencil hardness of the coatings was determined according to ASTM D3363, Standard Test Method for Film Hardness by Pencil Test. Hardness of each coating was determined relative to a standard set of pencil leads by scratching the leads across the coating at a 45 degree angle for about one-quarter of an inch. The process was repeated until a lead was identified that did not scratch the film. The number of the lead was recorded as the hardness.

Skydrol resistance of the coatings was determined referring to ASTM D870. Each sample was immersed in Skydrol LD-4 hydraulic fluid (available from Solutia, Inc.) at 60° C. for 24 hours. The test panels were visually examined for any blistering, cracking, leaching, shrinkage or loss of adhesion. The sample was wiped dry and the pencil hardness checked within 5 minutes according to ASTM D3363.

Set-to-touch time of the coatings was determined according to ASTM D1640, Standard Test Methods for Drying, Curing, or Film Formation of Organic Coatings at Room Temperature, procedure 7.2. To determine set-to-touch time, the test film was lightly touched with the tip of a clean finger and the fingertip was immediately placed against a piece of clean, clear glass. Observation was made to see if any of the coating was transferred to the glass. The film was set-to-touch when it still showed a tacky condition, but none of it adhered to the finger.

Dry-to-tape time of the coatings was determined referring to ASTM D1640. To determine dry to tape time, a strip of tape, 3M Scotch Masking Tape type 232, was pressed down using two passes of a 4.5-pound rubber covered roller. The tape remained on the sample for around 30 minutes and was then removed. The appearance of the coating was then checked. The coating was considered dry to tape when there was no mark left by the tape.

MEK resistance of the coatings was determined according to ASTM D5402, Standard Practice for Assessing the Solvent Resistance of Organic Coatings Using Solvent Rubs with MEK double rubs. The cured coatings were rubbed back and forth 200 times with firm finger pressure with cheesecloth that was soaked in methyl ethyl ketone (MEK) solvent. Rubbing through the coating to the substrate indicated a failure of the coating due to insufficient cure. Both the coating and the cloth were visually examined for any coating removal.

Specular Gloss of the coatings was determined according to D523, Standard Test Method for Specular Gloss using a BYK-Gardner Gloss meter.

Whirling Arm Rain Erosion Test was determined according to BSS7393 (Boeing Specification Support Standard, BSS), Whirling Arm Rain Erosion Test. The Whirling Arm Rain Erosion Test, Method 1 was applied to evaluate the intercoat adhesion of topcoat to the epoxy primer and/or the adhesion of the second topcoat to the first topcoat and/or to the primer.

Coatings Application Procedure

Clad aluminum 2024-T3 was abraded with scotch-brite, wiped with clean solvent, such as MEK, to obtain a clean surface. A non-chromate surface treatment coating such as Boegel EAP-9 (commercially available from PPG Aerospace) was sprayed and allowed to dry at least 2 hours at room temperature to a water free surface. A non-chromate epoxy primer, such as CA7502 (commercially available from PPG Industries, Inc.) or chromate epoxy primer, such as CA7700 (commercially available from PPG Industries, Inc.) was applied onto the surface treated coating and allowed to cure at least 2 hours at ambient temperature with dry film thickness of 0.5 to 1.0 mils A fresh mixed white topcoat was applied onto the epoxy primer with a dry film thickness of 1.0 to 2.0 mils and allowed to cure for 72 hours at ambient temperature, such as 25° C. and 50% relative humidity. Thereafter, a fresh mixed blue topcoat was applied onto the top of the white topcoat with a dry film thickness of 1.0 to 2.0 mils The coatings were allowed to cure for another seven days at ambient temperature, such as such as 25° C. and 50% relative humidity, before testing the coatings properties according to described methods.

Coatings Application for the Whirling Arm Rain Erosion Test

Clad aluminum 2024-T3 air foils with the dimension of 3 inches×6 inches×0.063 inches were abraded with scotch-brite, such as 3M type 7447, wiped with clean solvent, such as MEK to a clean surface. The leading edge nose at the tangent point between the radius and flat surfaces was masked off with 1 inch wide tape such as 3M Scotch tape 232. A non-chromate surface treatment coating such as Boegel EAP-9 (commercially available from PPG Aerospace) was sprayed onto the coupon and allowed to dry at least 2 hours at ambient temperature to a water free surface. A non-chromate primer such as CA7502 (commercially available from PPG Industries, Inc.) or a chromate primer such as CA7700 (commercially available from PPG Industries, Inc.) was applied onto the surface treated coating and allowed to cure at least 2 hours at ambient temperature with dry film thickness of 0.5 to 1.0 mils A fresh mixed white topcoat was applied onto the primer with a dry film thickness of 1.0 to 2.0 mils and allowed to cure for 72 hours at ambient temperature, such as 25° C. and 50% relative humidity. Thereafter, a fresh mixed blue topcoat was applied onto the top of the first topcoat with a dry film thickness of 1.0 to 2.0 mils Coatings films were allowed to cure for another seven days at ambient temperature before the testing, such as such as 25° C. and 50% relative humidity. The masking tape was removed and the air foils immersed in water at ambient temperature for 24 hours prior to the testing. Within one hour after removal from the water, the air foils were secured to a whirling arm fixture. The specimens were then exposed to 385 mile per hour (at specimen midpoint) with 3 to 4 inches per hour water spray (1 to 4 mm drop size) for 30 minutes. Failure was indicated when any coating peeled beyond 0.25 inches from the leading edge of the test coupons.

Examples

The following examples illustrate exemplary embodiments of the invention. However, the examples are provided for illustrative purposes only, and do not limit the scope of the invention. Unless otherwise indicated, all parts and percentages in the following examples, as well as throughout the specification, are by weight.

Raw Materials for the Isocyanate Prepolymer Preparation

Desmodur N 3300A is hexamethylene diisocyanate (HDI) based polyfunctional aliphatic isocyanate from Bayer and has the following properties: weight per gallon of 9.75, solid content of 100% and isocyanate content of 21.8%.

Permapol 97-125 is a polyester resin based on adipic acid, ethylene glycol, hexanediol, isophthalic acid and neopentyl glycol from PPG Industries, Inc. with the following properties: weight per gallon of 9.21, solid content of 100% and hydroxyl value of 125 mgKOH/g.

Adhesion Resin LTW is a polyester resin based on adipic acid, fumaric acid and octahydro-4,7-methano-1H-indene-dimethanol from Evonik Industries. In view of *National Industrial Chemicals notification and assessment scheme, full public report, Adhesion Resin BL 215C, File No. NA/212, date:* 1995/5710, it is believed to consist of 21% adipic acid, 13.5% fumaric acid and 65.5% octahydro-4,7-methano-1H-indene-dimethanol. It has number average molecular weight of 2,300, solid content of 60%, weight per gallon of 8.76, hydroxyl of 30 mgKOH/g, and acid number of 20~30 mgKOH/g based on solid resin.

Vestamin A139 is an aldimine based on isobutyl aldehyde and isophorone diamine according to its MSDS.

Preparation of Isocyanate for Control 1

Isocyanate for control experiment 1 was prepared by mixing 640 parts of Desmodur N3300A with 160 parts of methyl amyl ketone and obtained solution with the following properties: solid content of 80.0%, weight per gallon of 8.96 lb/gal, and NCO content of 17.36%.

Preparation of Isocyanate Prepolymer for Control 2

Isocyanate prepolymer for control experiment 2 was prepared by reacting Desmodur N3300A with a standard polyester resin Permapol 97-125 at elevated temperature. To a nitrogen-purged, 1-liter flask equipped with a thermocouple-controlled heating mantle, condenser and stirring blade were added 522 parts of Desmodur N3300A, 118 parts of Permapol 97-125 and 160 parts of methyl amyl ketone. The reaction was heated to 85° C. and held for 3 hours. At the end of the reaction, a clear isocyanate prepolymer solution was obtained with the following properties: non-volatile material of 80.0%, weight per gallon of 8.91 lb/gal, and NCO content of 12.81%.

Preparation of Isocyanate for Control 3

Isocyanate for control experiment 3 was a physical blend of Desmodur N3300A, Adhesion resin LTW and solvent at room temperature as recommended by the supplier's technology data sheet, adding to the coatings formulation as supplied. It was made by mixing 557 parts of Desmodur N3300A, 139 parts of Adhesion Resin LTW and 104 parts of methyl amyl ketone. It was used right away by mixing with Vestamin A139 and pigment concentrates and sprayed without induction time.

Preparation of Isocyanate Prepolymer for Example 1

Isocyanate prepolymer for example 1 was prepared by reacting Desmodur N3300A with Adhesion Resin LTW at elevated temperature. Experimental results indicated that Adhesion resin LTW was not compatible with Desmodur N3300A when mixed at room temperature. Therefore, Adhesion Resin LTW was mixed with the isocyanate and cooked at elevated temperature to obtain an isocyanate prepolymer solution, according to the following procedure. To a nitrogen-purged, 1-liter flask equipped with a thermocouple-controlled heating mantle, condenser and stirring blade were added about 557 parts of Desmodur N3300A, about 139 parts of Adhesion Resin LTW and about 104 parts of methyl amyl ketone. The reaction was heated to 85° C. and held for 3 hours. At the end of the reaction, a clear solution of isocyanate prepolymer was obtained with the following properties: non-volatile material of 80.0%, weight per gallon of 9.05 lb/gal, and NCO content of 14.71%. Prepolymer 1 was prepared with 13% by weight of the polyester resin and 87% by weight of isocyanate based on solid weight of the prepolymer, the ratio of isocyanate equivalent to hydroxyl equivalent was 65.6/1.0.

TABLE 1

Composition of the Isocyanate Prepolymer for Control 1, 2, 3 and Example 1

| Ingredients | Isocyanate for Control 1 | Prepolymer for Control 2 | Isocyanate for Control 3 | Prepolymer for Example 1 |
|---|---|---|---|---|
| Desmodur N3300A | 640.0 | 521.7 | 556.5 | 556.5 |
| Permapol 97-125 | | 118.3 | | |
| Adhesion Resin LTW | | | 139.1 | 139.1 |
| Methyl amyl ketone | 160.0 | 160.0 | 104.4 | 104.4 |
| Total | 800.0 | 800.0 | 800.0 | 800.0 |

Preparation Pigment Concentrates

The white and the blue pigment concentrates used in the examples were prepared by using high speed dispersing cowles blades with the amount of ingredients summarized in Table 2.

Preparation of White Pigment Concentrate

To a quarter-size can, 247.5 parts of methyl amyl ketone and 40.7 parts of Solsperse dispersing agent were charged. The mixer was started at low speed mixing and made a clear solution. 641.8 parts of Ti-Pure R-706 was slowly charged and the dispersing speed was adjusted accordingly for a good vortex which indicated good dispersing. The mixture was dispersed at around 2000 rpm for 30 minutes and allowed to cool down to ambient temperature. 70 parts of methyl propyl ketone was then charged to the mixture. The mixture was passed through a 2-liter Premium mill until a fineness ground of 7 plus was achieved. Thereafter, a stable white pigment dispersion with following properties was obtained: weight per gallon of 14.11 lb/gallon and solid content of 68.26%.

Preparation of Blue Pigment Concentrate

To a quarter-size can, 495.8 parts of methyl amyl ketone and 39.5 parts of Solsperse dispersing agent were charged. The mixer was started at low speed mixing and made a clear solution. Meanwhile, 1.8 parts of Bentone SD-2 and 7.1 parts of xylene were pre-mixed in a separate container and transferred to the quarter-size can after forming a gel. 73.6 parts of Ti-Pure R-706, 20.7 parts of Irgacolor Yellow 2GLMA, 2.1 parts of Raven 14 carbon black, 127.3 parts of Heliogen Blue 6700F, and 27.2 parts of Cinquasia Red B NRT-742-D were then slowly charged. The dispersing speed was adjusted accordingly for a good vortex which indicated good dispersing. The mixture was dispersed at around 2000 rpm for 30 minutes and allowed to cool down to ambient temperature. 70 parts of methyl propyl ketone was charged to the mixture. The mixture was passed through a 2-liter Premium mill until a fineness ground of 7 plus was achieved. Thereafter, the stable blue pigment dispersion with following properties was obtained: weight per gallon of 8.13 lb/gallon and solid content of 29.22%.

TABLE 2

Composition for the White and Blue Pigment Concentrates Preparation

| Ingredient | White Pigment Concentrate (g) | Blue Pigment Concentrate (g) |
|---|---|---|
| Methyl Amyl Ketone | 247.5 | 495.8 |
| Xylene | — | 7.1 |
| Bentone SD-2[1] | — | 1.8 |
| Solsperse[2] | 40.7 | 39.5 |
| Ti-Pure R-706[3] | 641.8 | 73.6 |
| Irgacolor Yellow 2GLMA[4] | — | 20.7 |
| Raven 14[5] | — | 2.1 |
| Heliogen Blue 6700F[6] | — | 127.3 |
| Cinquasia Red B NRT-742-D[7] | — | 27.2 |
| Methyl Propyl Ketone | 70.0 | 204.9 |
| Total | 1000.0 | 1000.0 |

[1]Rheology additive from Elementis Specialties
[2]Dispersing agent from Lubrizol
[3]White pigment from DuPont
[4]Pigment from BASF
[5]Pigment from Columbian Chemical Corporation
[6]Pigment from BASF
[7]Pigment from Clairant Preparation of Coatings Coatings were prepared by mixing the specified amount of isocyanate prepolymer, Vestamin A139 and the white or blue pigment concentrates as identified in Table 3. They were sprayed immediately after the mixing (no induction time). In each case, the white coating was applied onto CA7502 non-chromate primer with a dry film thickness of 1.5 mils and cured for 72 hours at ambient temperature, such as 25° C. and 50% relative humidity. Then, the fresh mixed blue coating was applied onto the top of the white coating with a dry film thickness of 1.5 mils. The coating system was allowed to further cure for seven days at ambient temperature before the testing. Pot life viscosity and drying time results are listed in Table 4 and coating properties of the system are listed in Table 5.

TABLE 3

Coatings Composition and Properties for Controls and Example 1 Coating

| Ingredients | Control 1 White | Control 1 Blue | Control 2 White | Control 2 Blue | Control 3 White | Control 3 Blue | Example 1 White | Example 1 Blue |
|---|---|---|---|---|---|---|---|---|
| White Pigment concentrate | 157.5 | | 158.4 | | 155.9 | | 155.9 | |
| Blue Pigment concentrate | | 90.7 | | 91.2 | | 89.8 | | 89.8 |
| Vestamin A139 | 27.0 | 27.0 | 20.1 | 20.1 | 21.8 | 21.8 | 21.8 | 21.8 |
| Isocyanate Control 1 | 100.0 | 100.0 | | | | | | |
| Prepolymer Control 2 | | | 100.0 | 100.0 | | | | |
| Isocyanate Control 3 | | | | | 100.0 | 100.0 | | |
| Prepolymer Example 1 | | | | | | | 100.0 | 100.0 |
| Total | 282.5 | 217.7 | 278.5 | 211.3 | 277.7 | 211.6 | 277.7 | 211.6 |
| Wet Coatings Properties | | | | | | | | |
| WPG (lb/gal) | 10.90 | 8.35 | 11.03 | 8.37 | 11.05 | 8.42 | 11.05 | 8.42 |
| NVM % | 75.39 | 61.31 | 74.76 | 59.98 | 74.97 | 60.50 | 74.97 | 60.50 |
| NCO/NH ratio | 2.15 | 2.15 | 2.13 | 2.13 | 2.25 | 2.25 | 2.25 | 2.25 |

TABLE 4

Pot Life Viscosity and Drying Time of the White Coating

| Properties | Control 1 | Control 2 | Control 3 | Example 1 |
|---|---|---|---|---|
| Initial viscosity (seconds)[1] | 17.63 | 24.25 | 18.80 | 19.65 |
| 4 hours viscosity (seconds)[1] | 18.07 | 26.78 | 22.33 | 22.03 |
| Tack-free time (hours) | 2.0 | 0.5 | 0.5 | 0.5 |
| Dry to tape (hours) | 4.0 | 1.5 | 1.5 | 1.5 |

[1]Admixed coating viscosities were measured in seconds by a #2 Signature Zahn cup at 25° C. The initial viscosity was the viscosity of the material measured immediately after mixing. The 4 hours viscosity was the viscosity of the material 4 hours after the initial mixing.

TABLE 5

Properties of the Coating Systems

| Property | Control 1 | Control 2 | Control 3 | Example 1 |
|---|---|---|---|---|
| Dry/Wet Adhesion | 5B/5B | 5B/5B | 5B/3B | 5B/5B |
| 20°/60° Gloss | 79.7/93.8 | 43.9/87.8 | 69.4/88.7 | 78.2/91.5 |
| Pencil Hardness | 6H | 6H | 6H | 6H |
| Pencil Hardness after Skydrol LD-4 Test | 3H | 3H | 3H | 3H |
| 200 MEK DR | No mar! | No mar! | No mar! | No mar! |
| Rain Erosion Test | Failed to primer! | Failed to white topcoat! | Failed to primer! | Pass |

The results in Table 5 show that the Control 1 topcoat system, which consisted of polyisocyanate and aldimine failed the Whirling Arm Rain Erosion test with adhesion failure happened between the primer and white topcoat. Topcoat Control 2, which consisted of isocyanate prepolymer and aldimine failed the Whirling Arm Rain Erosion test too, however, the adhesion failure happened between the blue topcoat and white topcoat. Topcoat Control 3, which consisted of isocyanate prepolymer, adhesion resin polyester polyol and aldimine failed the Whirling Arm Rain Erosion test with adhesion failure between the primer and the white topcoat. Example 1 had excellent intercoat adhesion of 72 hours overcoat window as tested by the Whirling Arm Rain Erosion test.

In addition, the cured coating had very good MEK resistance, pencil hardness, good gloss and excellent Skydrol resistance.

Preparation of Isocyanate Functional Prepolymers 2-8

Isocyanate functional prepolymers comprising different amount of tricyclodecane-containing polyester polyol were prepared in the following examples by changing the ratio of isocyanate to polyester. The composition for the preparation of each prepolymer is listed in Table 6. The prepolymers were prepared with same procedure as Example 1.

Prepolymer 2 was prepared with 5% by weight of tricyclodecane-containing polyester polyol resin and 95% by weight of isocyanate based on total solid weight, the ratio of isocyanate equivalent to hydroxyl equivalent was 185.2/1.0. Prepolymer 3 was prepared with 20% by weight of tricyclodecana-containing polyester polyol and 80% by weight of isocyanate based on solid weight, the ratio of isocyanate equivalent to hydroxyl equivalent was 38.8/1.0. Prepolymer 4 was prepared with 30% by weight of tricyclodecane-containing polyester polyol and 70% by weight of isocyanate based on solid weight, the ratio of isocyanate equivalent to hydroxyl equivalent was 22.6/1.0. Prepolymer 5 was prepared with 40% by weight of tricyclodecane-containing polyester polyol and 60% by weight of isocyanate based on solid weight, the ratio of isocyanate equivalent to hydroxyl equivalent was 14.5/1.0. Prepolymer 6 was prepared with 50% by weight of tricyclodecane-containing polyester polyol and 50% by weight of isocyanate based on solid weight, the ratio of isocyanate equivalent to hydroxyl equivalent was 9.7/1.0. Prepolymer 7 was prepared with 60% by weight of tricyclodecane-containing polyester polyol and 40% by weight of isocyanate based on solid weight, the ratio of isocyanate equivalent to hydroxyl equivalent was 6.5/1.0. Prepolymer 8 was prepared with 70% by weight of tricyclodecane-containing polyester polyol and 30% by weight of isocyanate based on solid weight, the ratio of isocyanate equivalent to hydroxyl equivalent was 4.15/1.0. In example 7, the prepolymer was very high viscosity and gelled in the can in one week. In example 8, the reaction was gelled in kettle.

TABLE 6

Composition and Properties of Isocyanate Prepolymers

| Ingredients | Ex. 2 | Ex. 3 | Ex. 4 | Ex. 5 | Ex. 6 | Ex. 7 | Ex. 8 |
|---|---|---|---|---|---|---|---|
| Desmodur N3300A | 608.0 | 448.0 | 392.0 | 288.0 | 240 | 192 | 144 |
| Adhesion Resin LTW | 53.0 | 186.6 | 280.0 | 320.0 | 400 | 480 | 560 |
| Methyl Amyl Ketone | 139.0 | 165.4 | 128.0 | 192.0 | 160 | 128 | 96 |
| Total | 800.0 | 800.0 | 800.0 | 800.0 | 800.0 | 800.0 | 800.0 |
| Properties |  |  |  |  |  |  |  |
| WPG (lb/gal) | 8.99 | 8.72 | 8.78 | 8.46 | 8.51 | 8.56 | n/a |
| Solid Content (Wt %) | 80.0 | 70.0 | 70.0 | 60.0 | 60.0 | 60.0 | n/a |
| NCO content (%) | 16.37 | 11.61 | 9.80 | 6.89 | 5.29 | 3.74 | n/a |

Preparation of Coating Examples 2, 3, 4 and 5

Coatings were formulated with the same procedure as coating Example 1 by mixing the amount of prepolymer, aldimine and the white or blue pigment concentrates specified in Table 7. In each case, they were sprayed immediately after the mixing, without induction time. The white topcoat was applied onto CA7502 non-chromate primer with a dry film thickness of 1.5 mils and cured for 72 hours at ambient temperature, such as 25° C. and 50% relative humidity. Then the fresh mixed blue topcoat was applied onto the white topcoat with a dry film thickness of 1.5 mils. The coating system was allowed to further cure for seven days at ambient temperature before the testing. Coating Example 2, 3, 4 and 5 were formulated with 2.2/1.0 ratio of isocyanate to amine hydrogen equivalent ratio, with compositions listed in Table 7 and coatings properties results listed in Table 8. Meanwhile, coating Example 6 and 7 were formulated with about 1.5/1.0 ratio of isocyanate to amine hydrogen equivalent ratio, with compositions listed in Table 9 and coatings properties results listed in Table 10.

TABLE 7

Composition for White and Blue Topcoat Coatings

| | Example 2 | | Example 3 | | Example 4 | | Example 5 | |
|---|---|---|---|---|---|---|---|---|
| Ingredients | White | Blue | White | Blue | White | Blue | White | Blue |
| White Pigment concentrate | 157.0 | | 129.4 | | 120.5 | | 98.0 | |
| Blue Pigment concentrate | | 90.4 | | 74.6 | | 69.4 | | 56.5 |
| Methyl Propyl Ketone | | | 9.7 | 9.7 | | 9.7 | 20.1 | 20.1 |
| Vestamin A139 | 24.1 | 24.1 | 17.4 | 17.4 | 14.7 | 14.7 | 10.6 | 10.6 |
| Prepolymer 2 | 100.0 | 100.0 | | | | | | |
| Prepolymer 3 | | | 100.0 | 100.0 | | | | |
| Prepolymer 4 | | | | | 100.0 | 100.0 | | |
| Prepolymer 5 | | | | | | | 100.0 | 100.0 |
| Total | 281.1 | 214.5 | 256.5 | 201.7 | 235.2 | 193.8 | 228.7 | 187.2 |
| Wet Coatings Properties | | | | | | | | |
| WPG (lb/gal) | 10.97 | 8.38 | 10.47 | 8.23 | 10.70 | 8.28 | 8.99 | 8.07 |
| NVM % | 75.15 | 60.84 | 68.50 | 54.14 | 70.98 | 54.16 | 65.90 | 46.53 |
| NCO/NH ratio | 2.26 | 2.26 | 2.22 | 2.22 | 2.22 | 2.22 | 2.16 | 2.16 |

TABLE 8

Properties of Example Coating System

| Properties | Example 2 | Example 3 | Example 4 | Example 5 |
|---|---|---|---|---|
| Tack-free time (min) | 45 | 30 | 30 | 30 |
| Dry to tape (hours) | 2.0 | 1.5 | 1.0 | 1.0 |
| Dry/Wet Adhesion | 3B/3B | 5B/5B | 5B/5B | 5B/5B |
| 20°/60° Gloss | 83.3/92.1 | 65.1/87.8 | 46.5/85.0 | 20.0/67.4 |
| Pencil Hardness | 6H | 6H | 6H | 6H |
| Skydrol LD-4 Resistance | 5H | 4H | 3H | F |
| 200 MEK DR | No mar and scratch! | Very slight scratches and mar | Slight scratches and mar | Scratches and mar |
| Whirling Arm Test | Failed to the white topcoat | Pass | Pass | Pass |

Coating Example 2 was formulated with an isocyanate functional prepolymer containing 5% by weight of tricyclodecane-containing polyester polyol resin. The tack-free time was 45 minutes and dry-to-tape time was 2 hours. It was slower than drying time of coating Example 1, which has 13% Dicidol polyester polyol resin, but was faster than those of the coating Control 1, which doesn't have any polyester resin. The coating was high gloss, and had excellent chemical resistance and Skydrol resistance. However, coating example failed the Whirling Arm Rain Erosion test with adhesion failure happened between the white and blue topcoat.

Coating Example 3 was formulated with an isocyanate functional prepolymer containing 20% by weight of tricyclodecane-containing polyester polyol resin. The tack-free time was 30 minutes and dry-to-tape time was 1.5 hours, which were similar to coating Example 1. The coating was high gloss, and had excellent chemical resistance and Skydrol resistance. It had excellent intercoat adhesion with a 72 hours overcoat window.

Coating Example 4 was formulated with an isocyanate functional prepolymer containing 30% by weight of tricyclodecane-containing polyester polyol resin. The tack-free time was 30 minutes and dry-to-tape time was 1.0 hours, which were even faster than coating Example 3. The coating had excellent chemical resistance and Skydrol resistance. It had excellent intercoat adhesion with a 72 hours overcoat window.

Coating Example 5 was formulated with an isocyanate functional prepolymer containing 40% by weight of tricyclodecane-containing polyester polyol resin. The tack-free time was 30 minutes and dry-to-tape time was 1.0 hours, which were same as coating Example 4. The coating had excellent chemical resistance and Skydrol resistance. It had excellent intercoat adhesion with a 72 hours overcoat window.

Examples 6 and 7

Coating Systems with Prepolymers 3 and 5

White and blue coatings were prepared by mixing the ingredients and amounts listed in Table 9. In each case, the white coating was applied onto CA7502 primer with a dry film thickness of 1.5 mils and cured for 72 hours at ambient temperature. Then the blue topcoat was applied onto the white topcoat with a dry film thickness of 1.5 mils Coating properties are reported in Table 10.

TABLE 9

Composition for White and Blue Coatings

|  | Example 6 | | Example 7 | |
| --- | --- | --- | --- | --- |
|  | White | Blue | White | Blue |
| Ingredients | | | | |
| White Pigment concentrate | 128.4 | | 98.0 | |
| Blue Pigment concentrate | | 74.6 | | 56.5 |
| Methyl Propyl Ketone | 9.7 | 9.7 | 20.1 | 20.1 |
| Vestamin A139 | 25.9 | 25.9 | 15.2 | 15.2 |
| Isocyanate Prepolymer 3 | 100.0 | 100.0 | | |
| Isocyanate Prepolymer 5 | | | 100.0 | 100.0 |
| Total | 265.1 | 210.2 | 233.3 | 191.8 |
| Wet Coatings Properties | | | | |
| WPG (lb/gal) | 9.94 | 8.18 | 8.94 | 8.04 |
| NVM % | 72.15 | 55.97 | 66.65 | 47.83 |
| NCO/NH ratio | 1.50 | 1.50 | 1.50 | 1.50 |

TABLE 10

Properties of Example Coating System

| Properties | Example 6 | Example 7 |
| --- | --- | --- |
| Tack-free time (min) | 30 | 30 |
| Dry to tape (hours) | 1.5 | 1.0 |
| Dry/Wet Adhesion | 5B/5B | 5B/5B |
| 20°/60° Gloss | 52.6/93.0 | 29.3/85.0 |
| Pencil Hardness | 6H | 6H |
| Skydrol LD-4 Resistance | 4H | F |
| 200 MEK DR | Very slight scratches and mar | Scratches and mar |
| Whirling Arm Test | Pass | Pass |

Coating Example 6 was formulated with an isocyanate functional prepolymer containing 20% by weight of tricyclodecane-containing polyester polyol resin. Tack-free time was 30 minutes and dry-to-tape time was 1.5 hours, which were the same as coating Example 3. The coating was high gloss, and had excellent chemical resistance and Skydrol resistance. It had excellent intercoat adhesion after 72 hours overcoat window.

Coating Example 7 was formulated with an isocyanate functional prepolymer containing 40% by weight of tricyclodecane-containing polyester polyol resin. Tack-free time was 30 minutes and dry-to-tape time was 1.0 hours, which were same as coating Example 5. The coating had excellent chemical resistance and Skydrol resistance. It had excellent intercoat adhesion of 72 hours overcoat window.

Coating Examples 6 and 7 were formulated with an isocyanate to amine hydrogen equivalent weight ratio of 1.5/1.0. As compared to Example 3 and 5, which had isocyanate to amine hydrogen equivalent ratio of 2.2/1.0, there wasn't significant change in properties such as pencil hardness, MEK resistance, Skydrol resistance and the intercoat adhesion for 72 hours overcoat window.

Whereas particular embodiments of this invention have been described above for purposes of illustration, it will be evident to those skilled in the art that numerous variations of the details of the present invention may be made without departing from the invention as defined in the appended claims.

What is claimed is:
1. A coating composition comprising:
    (a) an isocyanate functional prepolymer comprising a reaction product of reactants comprising:
        (i) a polyisocyanate; and
        (ii) a tricyclodecane-containing polyester polyol; and
    (b) a blocked amine curing agent,
    wherein the reactants used to make the isocyanate functional prepolymer are used in relative amounts such that the equivalent ratio of NCO:OH is greater than 10:1.
2. The coating composition of claim 1, wherein the isocyanate functional prepolymer has a weight average molecular weight of no more than 50,000.
3. The coating composition of claim 1, wherein the tricyclodecane-containing polyester polyol is derived from an acid component and an alcohol component, wherein a tricyclodecane-containing polyol is present in the alcohol component in an amount of at least 10 weight percent, based on the total weight of the alcohol component.
4. The coating composition of claim 3, wherein the tricyclodecane-containing polyol is present in the alcohol component in an amount of at least 30 weight percent, based on the total weight of the alcohol component.
5. The coating composition of claim 1, wherein the tricyclodecane-containing polyester polyol is present in an amount of at least 90 percent by weight, based on the total weight of the polyols reacted with the polyisocyanate to make the isocyanate functional prepolymer.

6. The coating composition of claim 1, wherein the tricyclodecane-containing polyester polyol is used in an amount of at least 10 percent by weight, based on the total weight of the isocyanate functional prepolymer.

7. The coating composition of claim 6, wherein the tricyclodecane-containing polyester polyol is used in an amount of at least 40 percent by weight, based on the total weight of the isocyanate functional prepolymer.

8. The coating composition of claim 1, wherein the equivalent ratio of NCO:OH is at least 20:1 and no more than 150:1.

9. The coating composition of claim 1, wherein the equivalent ratio of NCO:OH is at least 20:1 and no more than 100:1.

10. The coating composition of claim 1, wherein the blocked amine curing agent comprise an aldimine.

11. The coating composition of claim 1, wherein the ratio of equivalents of isocyanate groups in the composition to equivalents of curing agent functional groups is in the range of 1 to 3:1.

12. The coating composition of claim 1, wherein the coating composition is substantially free of hydroxyl functional compounds.

13. A method of using the coating composition of claim 1, comprising applying the composition to a surface having a preexisting coating deposited thereon.

14. The method of claim 13, wherein the pre-existing coating has been on the surface for at least 72 hours.

15. The method of claim 13, wherein the pre-existing coating comprises a polyurethane.

16. The method of claim 13, further comprising applying a second coating to at least a portion of the surface coated with the coating composition.

* * * * *